United States Patent [19]

Taglieri

[11] Patent Number: 5,677,790
[45] Date of Patent: Oct. 14, 1997

[54] REFLECTOR AND FASTENING MECHANISM

[76] Inventor: Robb Taglieri, 68 Hawk La., Marlton, N.J. 08053

[21] Appl. No.: 166,832

[22] Filed: Dec. 15, 1993

[51] Int. Cl.$^6$ .............................. G02B 5/12; G02B 5/132
[52] U.S. Cl. .................... 359/515; 359/516; 359/544; 359/545
[58] Field of Search ................... 359/515–520, 359/521–526, 543–545

[56] References Cited

U.S. PATENT DOCUMENTS

| | | | |
|---|---|---|---|
| 3,038,381 | 6/1962 | Jones . | |
| 4,006,877 | 2/1977 | Niel | 359/523 |
| 4,102,562 | 7/1978 | Harper et al. . | |
| 4,312,567 | 1/1982 | Sklair . | |
| 4,384,548 | 5/1983 | Cohn | 359/518 |
| 4,600,269 | 7/1986 | Rass . | |
| 5,169,702 | 12/1992 | Schell . | |
| 5,193,026 | 3/1993 | Purvis et al. . | |
| 5,349,920 | 9/1994 | Koizumi | 359/515 |

FOREIGN PATENT DOCUMENTS

| | | |
|---|---|---|
| 2908909 | 9/1980 | Germany . |
| 8300318 | 1/1993 | Netherlands . |
| 0237399 | 7/1925 | United Kingdom . |

OTHER PUBLICATIONS

U.S. Department of Commerce, Identification Card & Building Pass P–89718, May 1991.

*Primary Examiner*—James Phan
*Attorney, Agent, or Firm*—Arnold D. Litt

[57] ABSTRACT

The subject invention comprises a light-reflective device comprising an article made of light-reflecting material to which is attached fastening means rotatably mounted thereto. Because of the moveable features of the fastening means of the subject invention, the article may be attached to varying objects in varying positions with respect thereto. For example, the reflective device may be worn by a jogger on his or her clothing. In addition, the device may be easily attached to a sneaker or a sock or a bicycle or a baby carriage and the like. Furthermore, because the reflective surface moves in varying positions relative to the fastening means, as the object to which it is attached moves (for example, a jogger), light, impacting upon the surface of the light-reflective device, is reflected in a pulsating manner thereby rendering the object more visible to an oncoming observer.

5 Claims, 5 Drawing Sheets

REFLECTOR AND FASTENING MECHANISM

BACKGROUND OF THE INVENTION

1. Field of the Invention

This invention relates to a light-reflective device and fastening mechanism for attachment to a person's clothing and to other objects such as baby carriages and bicycles, to identify their presence by reflection of light from the surface of the device.

2. Description of Prior Art

It is well known in the prior art to use highly reflective material attached to a person's clothing such as shown in U.S. Pat. No. 4,312,567. (Reflective device clipped onto a jogger by way of a stationary clip mounted to the rear of the reflective surface.) Differing fastening means have been described in the prior art including an adhesive strip attached to the rear of the reflective surface (U.S. Pat. No. 5,193,026) or hook and pile fasteners of the type sold under the trademark "Velcro" and as generally shown in U.S. Pat. No. 2,717,437. Additional illustrations of stationery clips are shown in U.S. Pat. No. 4,600,269.

All of these prior art mechanisms for fastening reflective surfaces onto objects such as the garments of joggers, baby carriages, bicycles and the like so as to make these objects visible to drivers of automobiles and pedestrians alike, when light is reflected from said reflective surface, suffer from common problems including difficulty of removal and reattachment of the reflective surface and limitations on the type of garments and other objects to which the fastening mechanism can attach. In addition, prior art fastening mechanisms for the reflective surfaces are garment-specific in that fasteners that, for example, clip easily to shirts, belt loops and the like, cannot be clipped easily to sneakers or other more difficultly accessible objects.

It can therefore be appreciated that there is a continuing need for, and interest in, improvements in the fastening mechanism respecting these reflective surfaces to permit facile attachment and removal of these reflective surfaces to a wide variety of objects and, further, to reduce the cost associated with prior art systems which, because of the stationary nature of the fastening mechanisms, require the user to purchase a number of reflectors bearing different fastening mechanisms so as to permit their attachment to different objects.

SUMMARY OF THE INVENTION

In view of the foregoing disadvantages inherent in the known types of fastening mechanisms relating to the reflective surfaces of the subject invention, the present invention provides an improved light reflective device to which is attached a fastening mechanism that permits easy attachment and removal of the reflective device from a wide variety of objects including a person's clothing, carriages, bicycles, mailboxes and the like, which objects require high visibility for automobile drivers and pedestrians alike under night conditions. It will also become evident that the present invention results in a substantial cost saving to the user in view of the fact that it can be fastened to a wide variety of objects as opposed to the prior art systems which are limited in their use.

The general purpose of the present invention, which will be described subsequently in greater detail, is to provide a new and improved reflective device which is characterized by ease of attachment and removal from a wide variety of objects. This system combines ease of use and is sufficiently light weight to allow it to be attached, for example, to a jogger's garment, without interfering with the free movement of the jogger as he or she moves. Since the reflective device of the subject invention may be attached to any part of the jogger's garment and/or sneakers, such jogger is no longer limited in terms of what he or she may wear so as to provide a surface for attachment of the reflective device. In short, the user no longer requires a multiplicity of separate reflective surfaces comprising differing fastening mechanisms but can utilize the subject invention to create high visibility of a number of objects as hereinafter described, by attachment to a number of differing positions on the said objects.

To attain this, representative embodiments of the concepts of the present invention are illustrated in the drawings set forth hereinafter.

Generally stated, the invention comprises a light-reflective device comprising an article made of light-reflecting material to which is attached fastening means rotatably mounted thereto, whereby as the fastening means is rotated relative to the article, the article may be attached to varying objects (including but not limited to those objects referenced in FIGS. 8A, 8B, 8C, 8D, 9A, 9B, 10A, 10B, 12, 13, 14A and 14B as shown in the drawings in varying positions with respect thereto.

There has thus been outlined, rather broadly, the more important features of the invention in order that the detailed description thereof that follows may be better understood and in order that the present contribution to the art may be better appreciated. There are, of course, additional features of the invention that will be described hereinafter which will form the subject matter of the claims appended hereto. In this respect, before explaining at least one (1) embodiment of the invention in detail, it is to be understood that the invention is not limited in its application to the details of construction and to the arrangements of the components set forth in the following description or illustrated in the drawings. The invention is capable of other embodiments and may be practiced and carried out in a variety of ways.

Also, it is to be understood that the phraseology and terminology employed herein are for the purpose of description and should not be regarded as limiting. As such, those skilled in the art will appreciate that the conception, upon which this disclosure is based, may readily be utilized as the basis for the designing of other structures, methods and systems for carrying out the several purposes of the present invention. It is therefore important that the claims be regarded as including such equivalent constructions insofar as they do not depart from the spirit and scope of the present invention.

Furthermore, the purpose of the foregoing Abstract is to enable the U.S. Patent and Trademark Office and the public generally, and especially any scientists, engineers and practitioners in the art who are not familiar with patent or legal terms or phraseology, to determine quickly from a cursory inspection the nature and essence of the technical disclosure of the application. The Abstract is neither intended to define the invention of the application, which is measured by the claims, nor is it intended to be limiting as to the scope of the invention in any way.

It is therefore an object of the present invention to provide a new and improved light-reflective device which has all of the advantages of the prior art but substantially none of their disadvantages.

It is another object of the present invention to provide a light-reflective device which may be fastened to objects by way of fastening means rotatably mounted thereto whereby as the fastening means is rotated relative to the article, the article may be attached to various objects in different positions thereby providing a cost efficient mechanism for imparting high visibility to the objects to which the reflective surface is attached, while eliminating the need to buy a multitude of reflective articles, thereby reducing the cost to the user relative to prior art systems.

It is still a further object of the present invention to provide a light-reflective device containing the fastening means of the present invention which is durable, reliable, easily and efficiently manufactured and marketed and which is of a low cost to the user.

Yet another object of the present invention is to provide a light weight, reusable reflective surface that is easily cleaned and maintained and is therefore reusable and cost efficient relative to prior art systems.

These, together with other objects of the invention, along with the various features of novelty which characterize the invention, are pointed out with particularity in the claims annexed to and forming a part of this disclosure. For better understanding of the invention, its operating advantages and the specific objects attained by its uses, reference should be had to the accompanying drawings and descriptive matter in which there is illustrated preferred embodiments of the present invention.

BRIEF DESCRIPTION OF THE DRAWINGS

The invention will be understood and objects other than those set forth above will become apparent when consideration is given to the following detailed description thereof. Such description makes reference to the annexed drawings wherein.

DESCRIPTION OF THE PREFERRED EMBODIMENT

Figure 1:
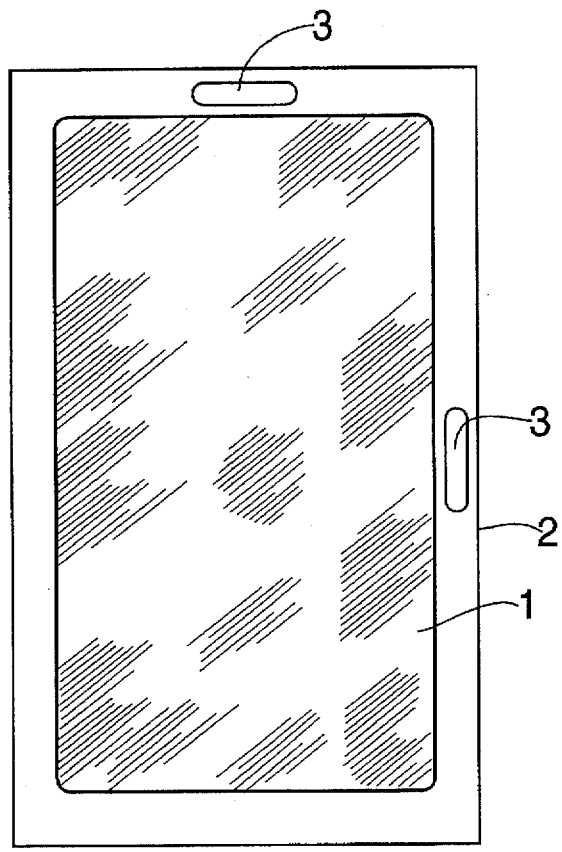
FIG. 1 is a top view of a rectangular light-reflective device.
Figure 3:
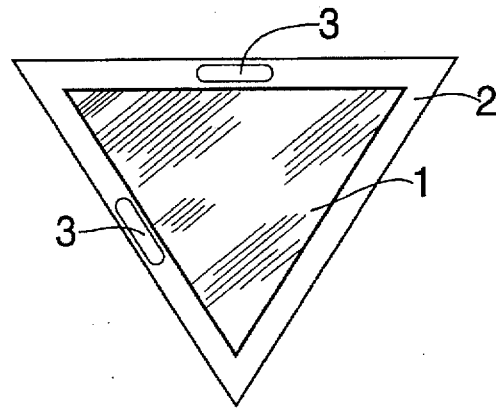
FIG. 3 is a top view of a triangular light-reflective device.
Figure 2:
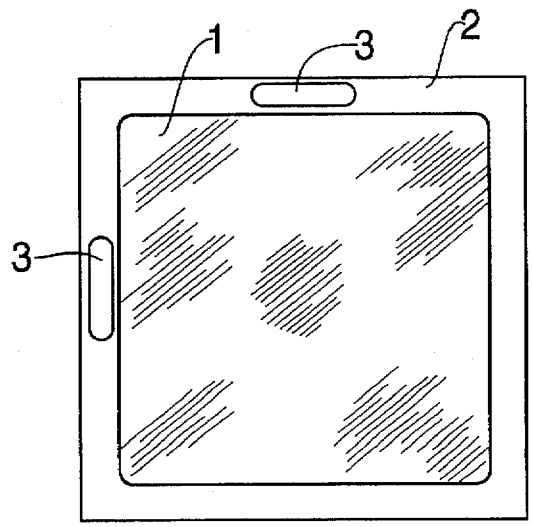
FIG. 2 is a top view of a square light-reflective device.

FIGS. 1 through 5 illustrate the general appearance of the light-reflective devices of the subject invention. These devices come in a wide variety of shapes and colors. FIG. 1 shows a generally rectangular light-reflective surface 1 which is contained within a clear laminate 2. Lamination provides a protective cover for the reflective surface thereby permitting long life and repeated usage thereof. The lamination technique is well known in the art and will not be detailed herein. Of course, any other clear covering known in the prior art may be utilized to protect the reflective surface, and it should be understood that the nature of such protective cover is not a limitation on the subject invention. Indeed, it is within the scope of this invention to utilize no protective covering but rather to use inexpensive surfaces which may be discarded after short term use, at a much lower per unit cost. A plurality of holes or openings 3 are situated around the periphery of the laminate through which the fastening means of the present invention may be inserted. The inclusion of more than one opening creates the flexibility on the part of the user to reposition the fastening means in varying positions about the periphery of the laminate, thereby increasing the variety of objects to which the light-reflective device may be attached.

Figure 4:
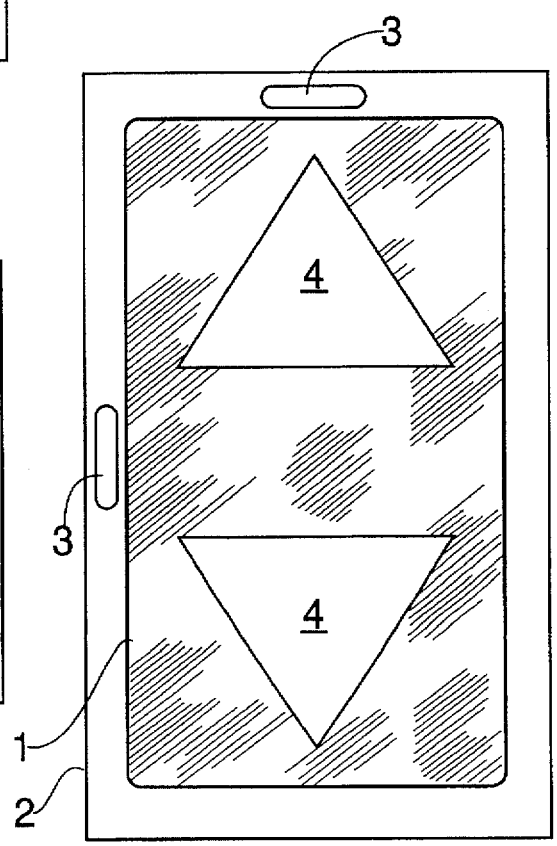
FIG. 4 is a top view of the light-reflective device comprising a plurality of design shapes.

FIG. 4 shows a light-reflective device containing a plurality of triangular objects 4.

Figure 5:
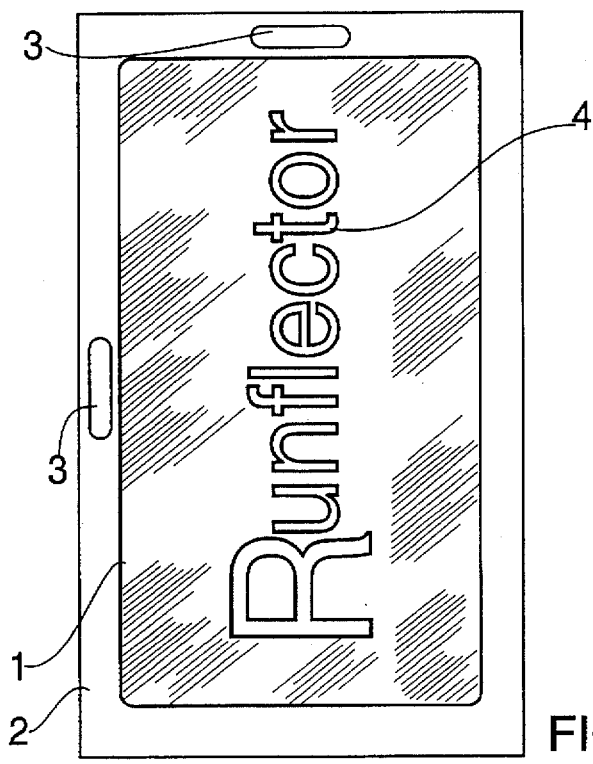
FIG. 5 is a bottom view of the light-reflective device of the instant invention showing written information thereon.

FIG. 5 demonstrates another aspect of the subject invention in which one surface of the reflective device permits information to be set forth thereon including advertising, product identification material, identifying material respecting the user, as well as medical advisories respecting the user.

Figure 6:
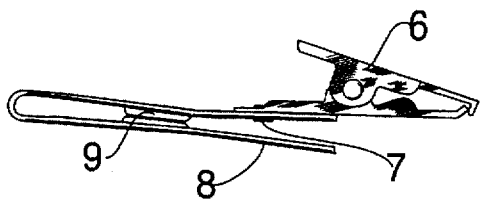
FIG. 6 is a side view of one embodiment of the fastening means of the instant invention.
Figure 7A:
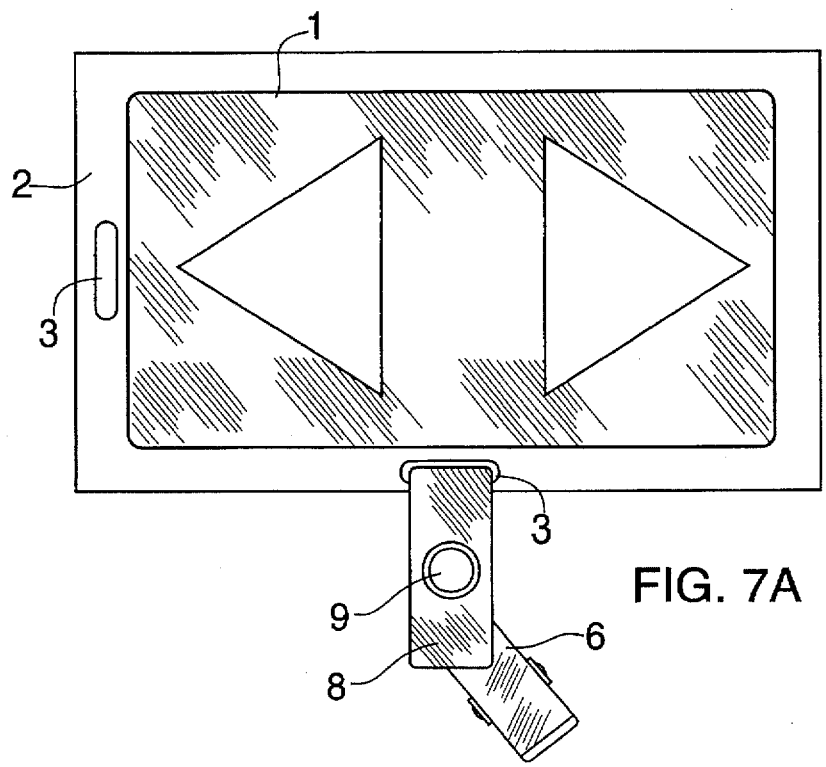
FIG. 7A is a top view of the light-reflective device and fastening means in combination.
Figure 7B:
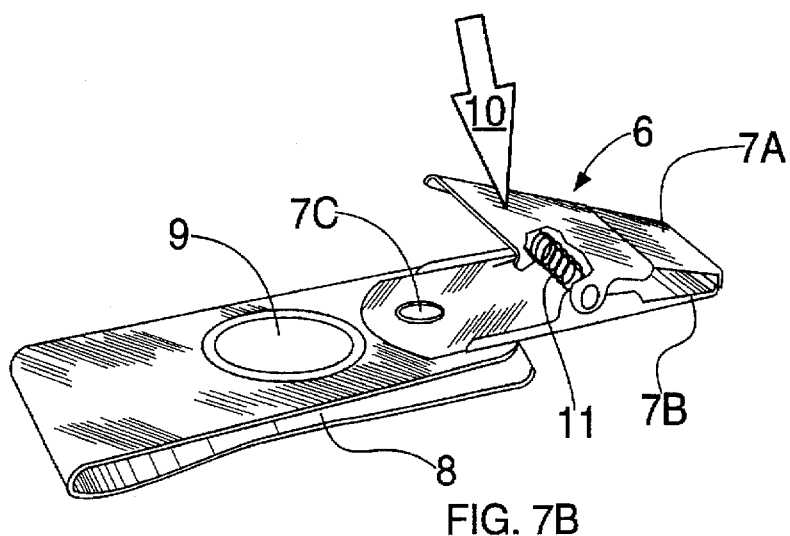
FIG. 7B is a perspective view of the fastening means showing the spring mechanism.

FIG. 6 shows a side view of the preferred fastening mechanism of the instant invention wherein clip 6 is rotatably mounted by rivet 7 to the plastic strip S. Preferably, the plastic strip is comprised of a relatively inexpensive plastic composition such as "Mylar". The plastic strip may be closed or opened and is locked in the closed configuration by way of snap 9. In practice, the user opens the Mylar strip 8 and inserts it through opening 3, as shown in FIG. 7A, thereafter locking the fastening mechanism into place by way of snap 9. As can be seen, clip 6 may be rotated about the rivet 7, thereby providing flexibility to the user in attaching the light-reflective device to the garment or object. It is within the scope of this invention to rivet the clip directly to the light-reflective device thereby eliminating the need for the plastic strip. In practice, the light-reflective device can be purchased with the fastening mechanism already attached thereto or, in another embodiment, the reflective device can be purchased separately from the fastening means and then combined when the user is ready to use it.

The preferred embodiment of the fastening means of the subject invention comprises a clip containing upper and lower jaws 7A and 7B. These jaws are closed in the resting position and upon exertion of force 10 to the surface 7A (finger pressure), the jaws are forced apart by overcoming the pressure asserted by spring 11 (which keeps the clip in a closed configuration in its resting state). While applying force 10 by use of finger pressure, the clip may be attached to the object desired. Upon release of the pressure, the spring forces the jaws of the clip closed, thereby attaching it to the object of choice. As shown, the clip is riveted to the plastic strip 8 by way of rivet 7C in such a manner as to permit clip 6 to rotate about the rivet thereby allowing for differing positions of the clip relative to the plastic stripe 8, permitting the user to attach the reflective device to a number of different objects.

Figure 8A:
FIGS. 8A through 14B are perspective views showing the positioning of the light-reflective device on various objects and articles of clothing using the fastening means of the subject invention.
Figure 8C:
Figure 8B:
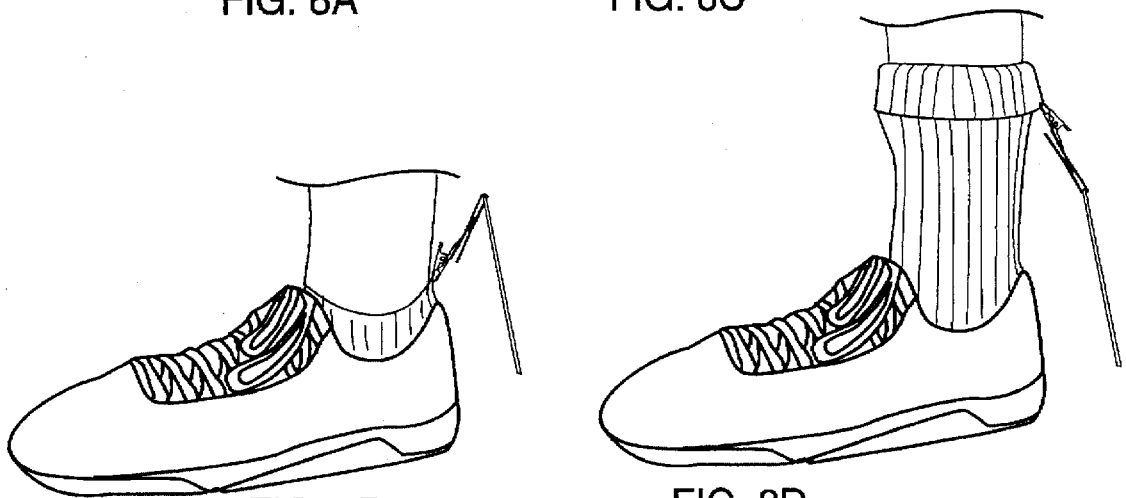
Figure 8D:

FIGS. 8A and 8B show the reflector attached to the rear of the sneaker (FIG. 8A) and a sock (FIG. 8B). FIGS. 8C and 8D show the reflector attached in another position on the sock.

Figure 9A:
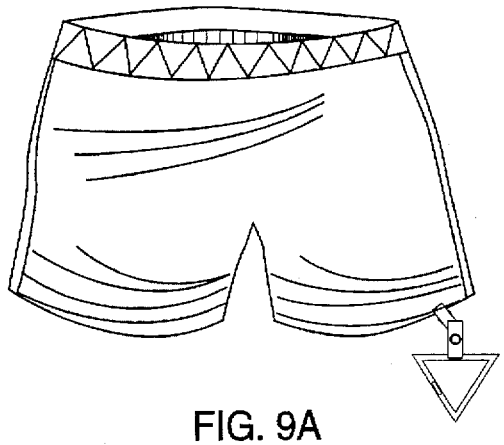
Figure 9B:
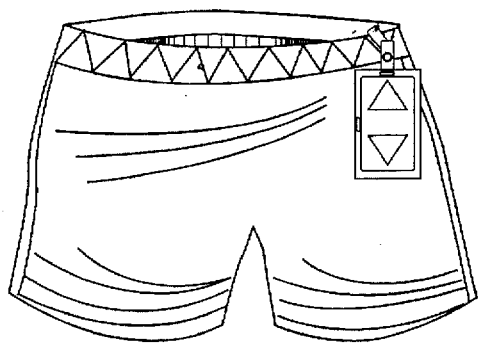

FIG. 9A shows the reflector attached to the bottom of shorts or at the belt or elastic of such shorts (FIG. 9B).

Figure 10A:
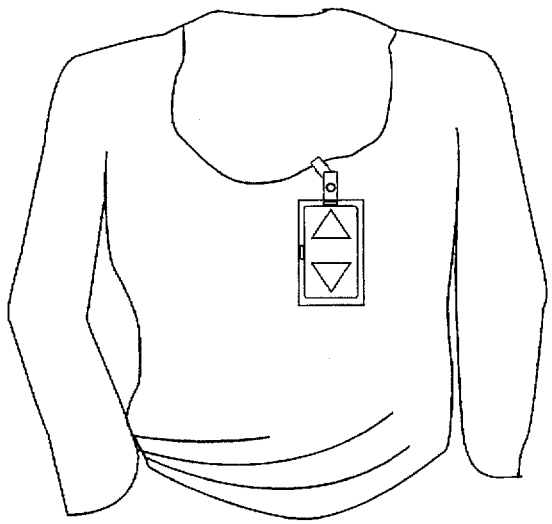
Figure 10B:
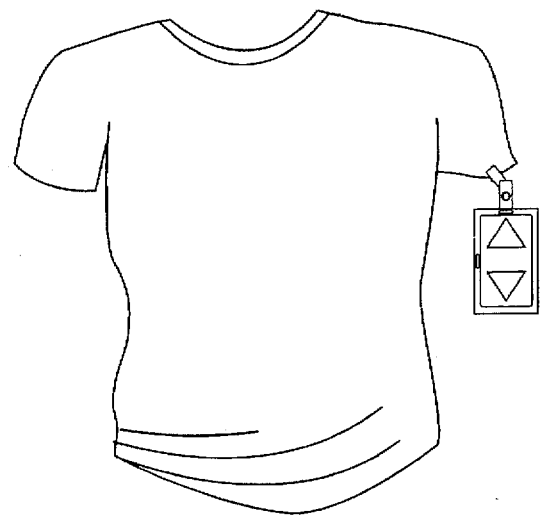
Figure 11:
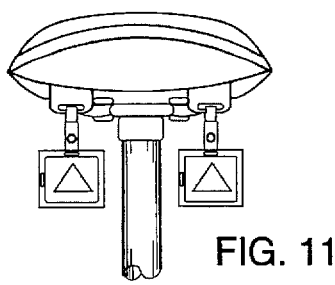
Figure 12:
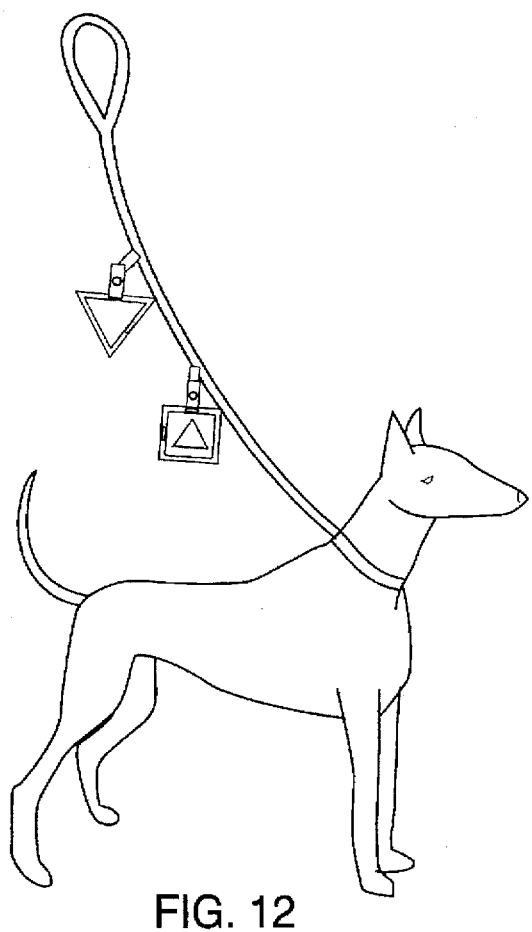

FIG. 10A shows the reflector attached to the neck portion of a sweatshirt. FIG. 10B shows the reflector attached to the sleeve of the sweatshirt. FIG. 11 shows the reflector attached to projections from a bicycle seat. FIG. 12 shows a plurality of reflectors attached to a dog's leash.

Figure 13:
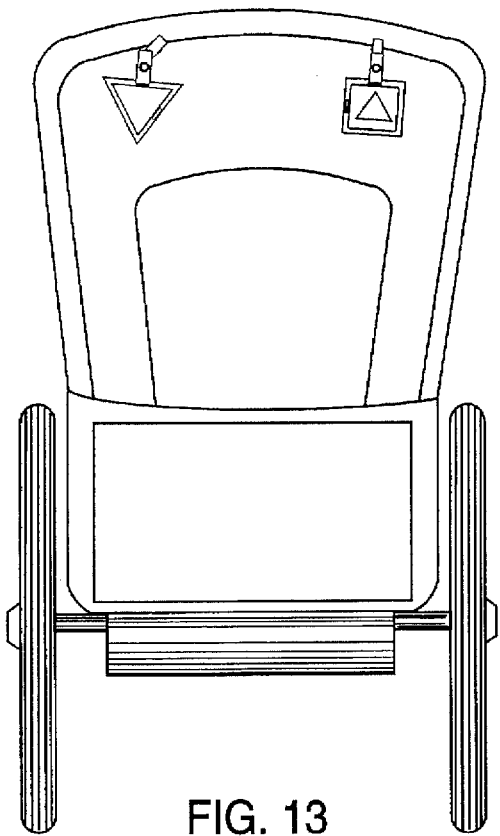

FIG. 13 shows the reflectors attached to a baby carriage.

Figure 14A:
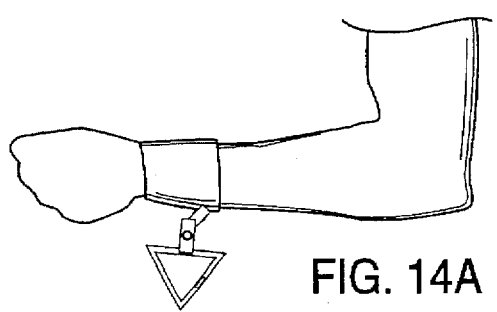

FIG. 14A shows the reflector attached to a person's sweatband.

Figure 14B:
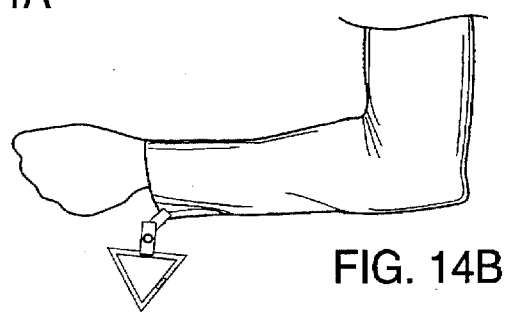

FIG. 14B shows the reflector attached to the sleeve of a person's shirt.

It should be understood that the clip itself is well known in the art. It is rather the combination of the clip with the light-reflective device that generates the novelty of this invention.

In another embodiment of the invention, the fastening means may comprise a wire tie which is rotatably mounted to the reflective surface, instead of the clip mechanism described hereinabove.

As an additional benefit generated by the light-reflective device and fastening means of the subject invention, is the fact that the reflective surface moves in varying positions relative to the fastening means as, for example, when a jogger moves or when the object moves. This movement is due to the rotatable mounting of the fastening device. When light, for example, from the head lamps of an automobile, impacts on the moving light-reflective surface, a pulsating reflection from the surface takes place, such pulsating light rendering the object more visible to an oncoming observer.

What is claimed is:

1. A light-reflective warning device for attaching to an article, said device made of light-reflecting material to which is attached fastening means comprising a clip, rotatably mounted to a plastic strip which is releasably mounted to the device by means of a snap whereby, as the fastening means is rotated relative to the device, the device may be attached to an article, and wherein a plurality of holes are placed about the periphery of the device to provide different positions for inserting the fastening means to the device.

2. The plastic strip of claim 1 wherein said plastic strip comprises Mylar.

3. The device of claim 1 wherein the light-reflective device moves in varying positions relative to the fastening means when said device is attached to a moving object such as a clothing part of a moving person, thereby generating a pulsating light when light impacts upon the light reflective surface.

4. A light-reflecting warning device for attaching to an article, said device comprising front and rear light-reflective surfaces which are encased in a clear protective covering comprising a laminate, wherein one surface contains brightly colored designs while the other surface contains written information and wherein fastening means are rotatably mounted to said cover, whereby as the fastening means are rotated relative to the device, the device may be attached to an article, and wherein a plurality of holes are placed about the periphery of the laminate to provide different positions for inserting the fastening means to the device.

5. A light-reflecting warning device for attaching to an article, said device comprising front and rear light-reflective surfaces which are encased in a clear protective covering and wherein fastening means are rotatably mounted to said cover, whereby, as the fastening means are rotated relative to the device, the device may be attached to an article, and wherein a plurality of holes are placed about the periphery of the light-reflecting warning device to provide different positions for inserting the fastening means to the device.

* * * * *